United States Patent
Bunn

(10) Patent No.: US 6,907,528 B1
(45) Date of Patent: Jun. 14, 2005

(54) METHOD AND SYSTEM FOR CRYPTOGRAPHICALLY AUTHENTICATING A PRINTED DOCUMENT BY A TRUSTED PARTY

(75) Inventor: Michael George Bunn, Reading (GB)

(73) Assignee: Fujitsu Services Limited, Slough (GB)

( * ) Notice: Subject to any disclaimer, the term of this patent is extended or adjusted under 35 U.S.C. 154(b) by 0 days.

(21) Appl. No.: 09/504,150

(22) Filed: Feb. 15, 2000

(30) Foreign Application Priority Data

Mar. 26, 1999 (GB) ............................................. 9906924

(51) Int. Cl.[7] .............................................. H04L 9/00
(52) U.S. Cl. ...................... 713/179; 713/155; 713/156; 713/168; 713/176
(58) Field of Search ............................... 713/168, 155, 713/156, 176, 179

(56) References Cited

U.S. PATENT DOCUMENTS

| | | | | |
|---|---|---|---|---|
| 5,351,302 A | * | 9/1994 | Leighton et al. | 380/30 |
| 5,420,924 A | | 5/1995 | Berson | 380/23 |
| 5,652,794 A | | 7/1997 | Lepetit | |
| 5,671,282 A | * | 9/1997 | Wolff et al. | 713/179 |
| 5,671,285 A | * | 9/1997 | Newman | 705/78 |
| 5,742,685 A | | 4/1998 | Berson | 380/25 |
| 5,748,738 A | | 5/1998 | Bisbee | 380/25 |
| 5,828,751 A | * | 10/1998 | Walker et al. | 713/175 |
| 5,912,974 A | * | 6/1999 | Holloway et al. | 380/51 |
| 5,923,763 A | * | 7/1999 | Walker et al. | 380/51 |
| 6,085,322 A | * | 7/2000 | Romney et al. | 713/176 |
| 6,111,953 A | * | 8/2000 | Walker et al. | 380/51 |
| 6,135,646 A | * | 10/2000 | Kahn et al. | 709/217 |
| 6,188,766 B1 | * | 2/2001 | Kocher | 380/246 |
| 6,253,193 B1 | * | 6/2001 | Ginter et al. | 705/57 |
| 6,289,453 B1 | * | 9/2001 | Walker et al. | 713/175 |
| 6,363,483 B1 | * | 3/2002 | Keshav | 713/176 |
| 6,567,530 B1 | * | 5/2003 | Keronen et al. | 382/100 |
| 6,622,247 B1 | * | 9/2003 | Isaak | 713/155 |

FOREIGN PATENT DOCUMENTS

| | | | |
|---|---|---|---|
| EP | 0 187 448 | 7/1986 | |
| EP | 0 372 692 | 6/1990 | |
| EP | 0 599 558 | 6/1994 | |
| EP | 0 600 646 | 6/1994 | |
| EP | 0729 120 A2 | * 2/1995 | ............ G07D/7/00 |
| EP | 0 640 946 | 3/1995 | |
| EP | 0782 114 A2 | * 12/1995 | ............ G07C/9/00 |
| EP | 0 710 934 | 5/1996 | |
| EP | 0 729 120 | 8/1996 | |
| EP | 0 730 243 | 9/1996 | |
| EP | 0 782 114 | 7/1997 | |
| FR | 2 765 014 | 12/1998 | |
| WO | WO 94/19770 | 9/1994 | |

OTHER PUBLICATIONS

Schneier, Bruce; Applied Cryptography; 1996; John Wiley & Sons, Inc.; 2nd Edition; pp. 21–46 and 169–187.*
VeriSign 'VeriSign Certification Practice Statement'; May 30, 1997; VeriSign, Inc. version 1.2; Chapter 7.*

* cited by examiner

Primary Examiner—Gilberto Barrón, Jr.
Assistant Examiner—Jung Kim
(74) Attorney, Agent, or Firm—Barnes & Thornburg

(57) ABSTRACT

A method for authenticating a printed document is described. A document producer sends information to be included in a document to an authentication authority. The authentication authority cryptographically generates an authentication code from this information, and sends the authentication code back to the document producer. The document producer then prints the document, including both the information and the authentication code, and a bar code representing the authentication code. A document checker scans in the bar code, and cryptographically checks the authentication code against the information in the document.

10 Claims, 3 Drawing Sheets

МЕТHOD AND SYSTEM FOR CRYPTOGRAPHICALLY AUTHENTICATING A PRINTED DOCUMENT BY A TRUSTED PARTY

BACKGROUND TO THE INVENTION

This invention relates to a method and apparatus for authenticating printed documents.

It is frequently required to provide some way of checking the authenticity of printed documents, to confirm that the document has been issued from a particular source, and that the information in it has not been tampered with. In particular, such authentication may be required for certificates of various kinds.

As an example, in the UK it is a requirement that any road vehicle over three years old should have a test certificate, referred to as an MOT certificate. These certificates are issued by licensed vehicle testing stations, following an inspection of the vehicle to check its roadworthiness and compliance with legal requirements. The certificate must be presented at a post office when the owner of the vehicle re-licenses it. Clearly, the post office should check that the certificate is not a forgery, and that the information in it has not been altered. At present, the post office clerk does this simply by making a visual check.

The object of the invention is to provide an improved method for authenticating printed documents.

SUMMARY OF THE INVENTION

According to the invention a method for authenticating a printed document comprises the following steps:

a) a document producer sends information to be included in a document to an authentication authority;

b) the authentication authority cryptographically generates an authentication code from this information, and sends the authentication code back to the document producer;

c) the document producer prints the document, including both the information and the authentication code; and d) a document checker cryptographically checks the authentication code against the information in the document.

In the MOT certificate example described above, the document producer would be the vehicle testing station, the authentication authority may be a central agency run by (or with powers delegated by) the government Vehicle Inspectorate (VI), and the document checker may be the post office at which the MOT is presented.

The authentication code may be generated and checked using a cryptographic key associated with the authentication authority. A secret key, known to both the authentication authority and the document checker, may be used. Alternatively, a public/private key pair may be used where the authentication code is generated using the authentication authority's private key and checked using its public key.

One document authentication method in accordance with the invention will now be described by way of example with reference to the accompanying drawings.

DESCRIPTION OF AN EMBODIMENT OF THE INVENTION

Figure 1:
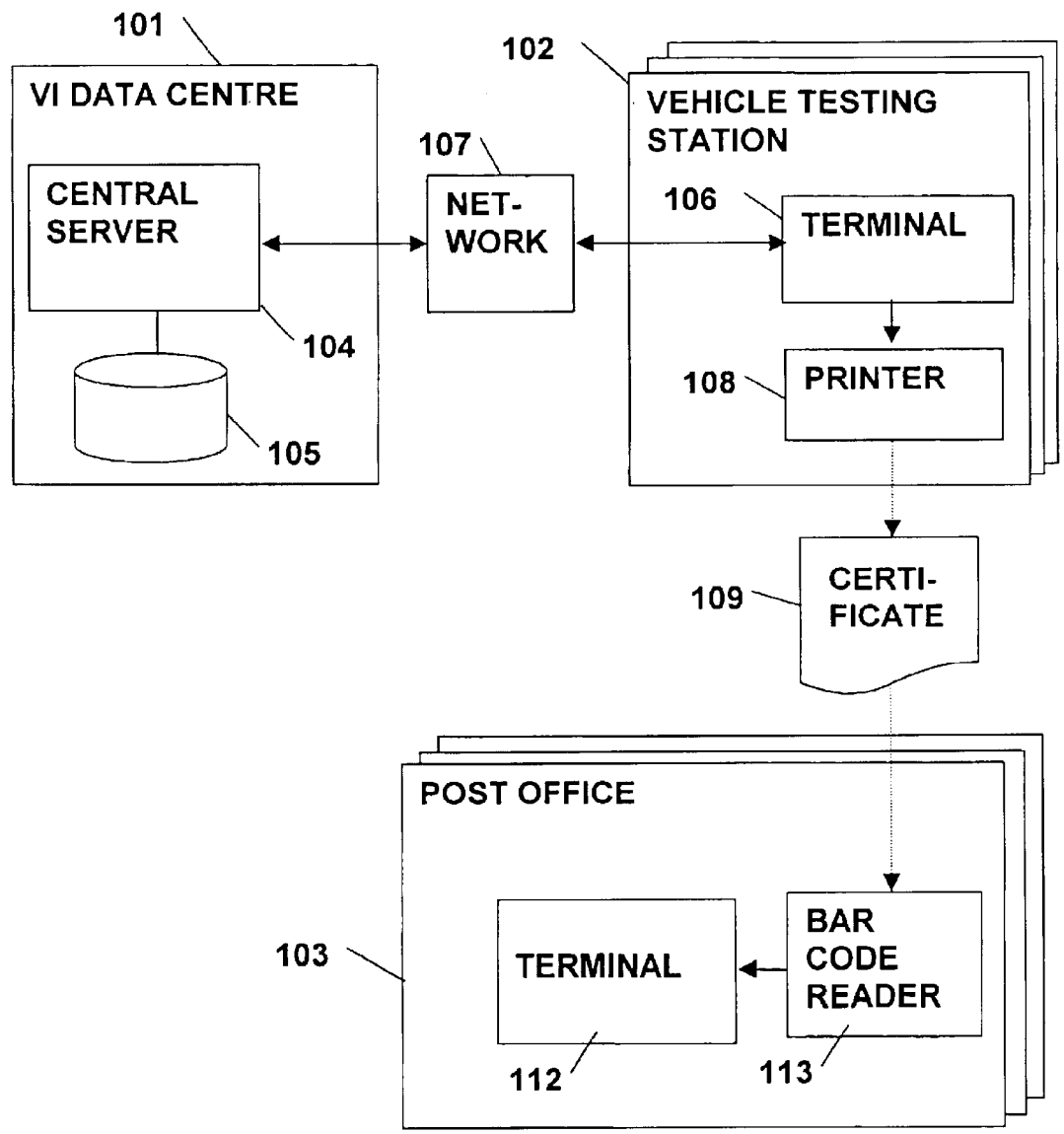
FIG. 1 is a schematic diagram of a system for issuing and authenticating certificates.

Referring to FIG. 1, the system involves the following entities:

VI Data Centre 101. This is a central agency, run by the Vehicle Inspectorate (VI).

Vehicle testing stations (VTS) 102. These are authorised by the VI to test vehicles and to issue MOT certificates. Each vehicle testing station may employ one or more authorised vehicle testers to carry out the tests.

Post Offices 103.

The VI Data Centre includes a central server computer 104, and a database 105. The database holds details of all licensed vehicles, vehicle testing stations, and authorised vehicle testers. The VI Data Centre has a secret key, referred to herein as the VI secret key, which in this example is known to both the VI data centre and the post offices. Each of the vehicle testing stations 102 has a computer terminal 106, which can communicate with the central server 104 by way of a network 107. The terminal is connected to a printer 108, which is used for printing the MOT test certificates 109. The printer 108 incorporates a barcode scanner, so that it can read bar-codes on blank certificates inserted into the printer.

Each of the terminals 106 includes communications software, which manages communications between terminal and the central server. All communications between terminal and the central server are encrypted, to ensure that messages cannot be intercepted. In addition, security technology is used to verify the authenticity of both ends of the link, to prevent a rogue device from linking into the network and pretending to be a terminal.

Figure 2:
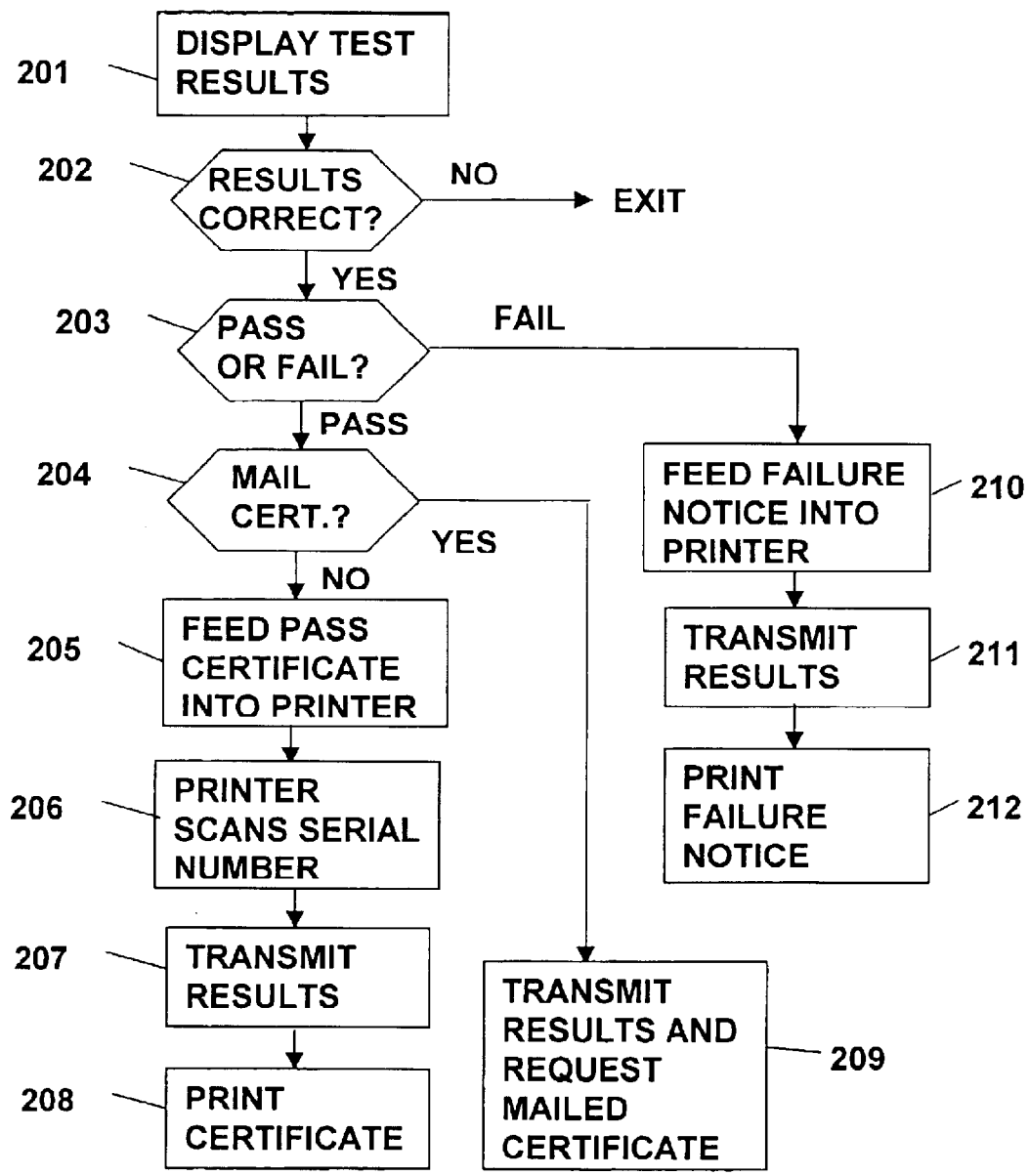
FIG. 2 is a flow chart showing the operation of a software component for issuing certificates.

In operation, a vehicle tester can enter information relating to a particular vehicle test into the terminal. The terminal includes a function which allows the vehicle tester to confirm the results of a test and, if the results are confirmed, to print a test certificate or failure notice as appropriate. FIG. 2 shows this function in more detail.

(Step 201) The function first displays the test information, with the overall result (pass or fail) summarized.

(Step 202) The function then asks the tester to confirm whether or not the test results are correct. If they are not correct, the function exits, and the tester may then go back to change the test information.

(Step 203) If the tester confirms that the results are correct, the function then branches according to the test result. (Step 204) If the test result was "pass", the function prompts the user to specify whether the test certificate is to be printed locally, at the test station, or mailed directly from the VI Data Centre to the registered keeper of the vehicle.

(Step 205) If the test certificate is to be printed locally, the function prompts the user to feed a blank pass certificate into the printer 108. Each blank pass certificate has a unique pre-printed serial number, and a barcode containing the serial number, as well as other security features such as a watermark. The VI keeps a record of the serial numbers of the certificates issued to each testing station, so that each certificate can be traced back to a particular testing station.

(Steps 206–207) When the certificate is in the printer, the function instructs the barcode scanner incorporated in the printer to scan in the certificate serial number. The terminal then transmits a message to the central server. The message contains details of the tester and the test station, the certificate serial number, the vehicle details, and the test results.

When the central server 104 receives this message, it performs a final check to confirm that the tester and the vehicle test station are duly authorised to perform the test.

Assuming this check is satisfactory, the central server proceeds as follows. First, it generates a message authentication code (MAC) from a predetermined sub-set of information in the message. In this example, the MAC is generated by performing a key-dependent one-way hash of the information, using the VI secret key. The central server transmits this MAC back to the terminal.

(Step 208) When the terminal receives the MAC, it prints the certificate. The contents of the certificate are described below.

(Step 209) If on the other hand the test certificate is to be mailed directly to the registered keeper of the vehicle, the function transmits the test information to the central server, with a request for a mailed certificate. The central server performs checks as described above, and if these checks are satisfactory, prints the certificate.

(Steps 210–212) If the test result was "failure", the function prompts the user to feed a blank failure notice into the printer. The function then transmits the test information to the central server, and prints the failure notice.

Figure 3:
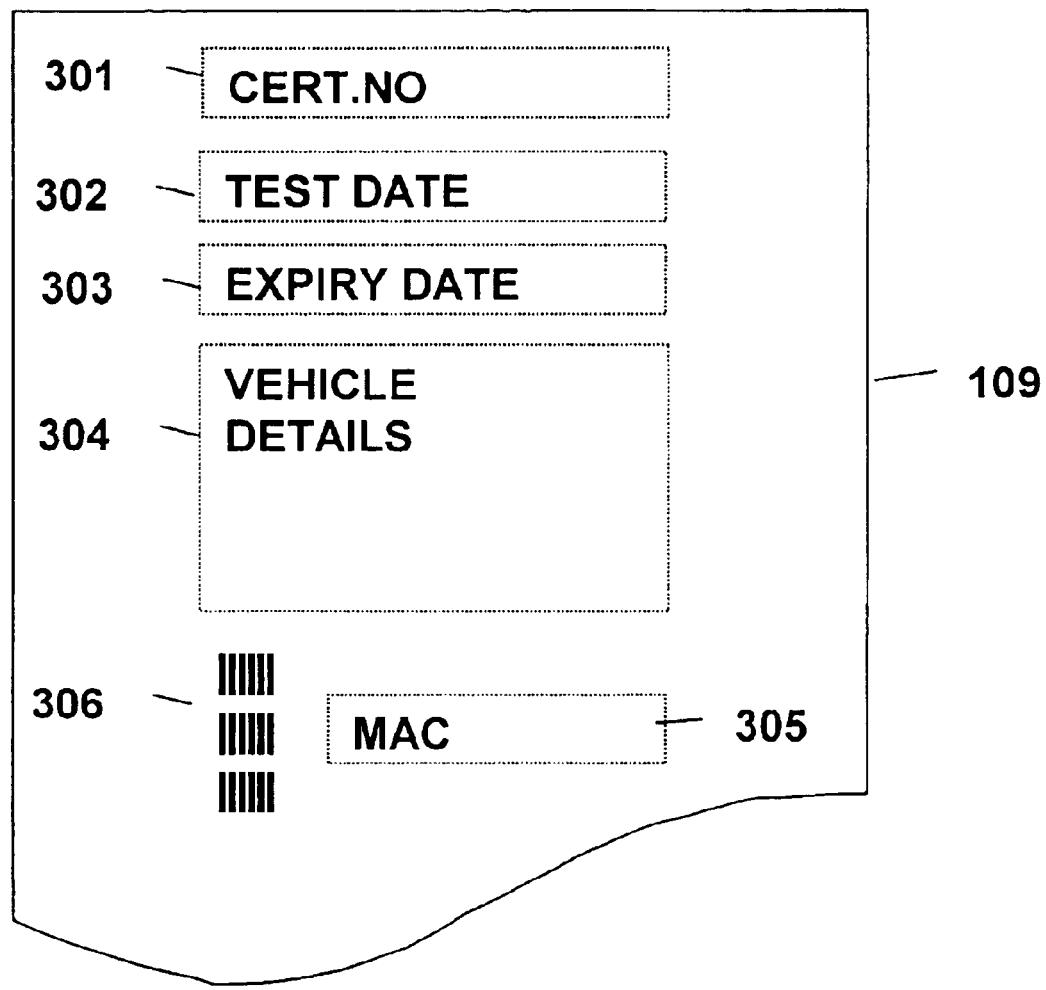
FIG. 3 is a schematic diagram showing a certificate produced by the system.

FIG. 3 shows the format of the certificate. It includes the following:

Pre-printed certificate serial number 301, and pre-printed barcode (not shown) containing this serial number.

Test date 302

Expiry date of certificate 303.

Vehicle details 304.

MAC 305, as a string of characters.

Bar code 306, representing the MAC in bar code form.

Referring again to FIG. 1, each of the Post Offices 103 is provided with at least one terminal 112, having a bar code reader 113. It is assumed that the terminal has knowledge of the VI secret key.

When a vehicle owner presents an MOT certificate at the post office, the post office clerk uses the bar code reader 113 to scan the bar code 306 on the certificate, so as read the MAC into the terminal.

The clerk also types in the predetermined sub-set of information from the certificate (i.e. the same sub-set as used by the central server to generate the MAC). The terminal then uses this information, along with the VI secret key, to generate a MAC, and compares this with the MAC read from the bar code. If they are not equal, the terminal generates a message to alert the clerk.

If for any reason the bar code reader will not read the bar code, the clerk may type the MAC into the terminal, from the printed version of the VI signature.

In summary, it can be seen that the system described above allows a certificate to be authenticated quickly and easily.

Some Possible Modifications

It will be appreciated that many modifications may be made to the system described above without departing from the scope of the present invention. For example, instead of using a secret key to form the MAC and to check it, a public/private key pair may be used. In this case, the authentication code is generated using the authentication authority's private key and checked using its public key.

Instead of requiring the clerk to type information from the certificate into the terminal, the information could be scanned in.

Instead of requiring the clerk to scan or key in the MAC from the certificate, the terminal may display the MAC it has generated, so that the clerk can visually compare this with the MAC printed on the certificate.

The vehicle test station could be arranged to authenticate the previous year's certificate, before generating a new one.

It should be noted that the invention is not restricted to issuing of MOT certificates as described above, but can be used in any application where it is required to authenticate a printed document.

What is claimed is:

1. A method for producing and authenticating a printed test certificate compressing the following steps:

a) a test certificate producer performs a test and generates test information to be included in the test certificate;

b) the test certificate producer generates said test information, and also pre-printed information read from a blank test certificate, to an authentication authority;

c) the authentication authority checks whether the test certificate producer is authorized to perform the test and, if so, cryptographically generates an authentication code form said test information and said pre-printed information, and sends the authentication code back to the test certificate producer;

d) upon receipt of the authentication code from the authentication authority, the test certificate producer prints both said test information and said authentication code on the blank test certificate; and e) upon presentation of the printed test certificate for authentication, a certificate checker cryptographically checks the authentication code against said test information and said pre-printed information in the printed test certificate to determine whether the printed test certificate is authentic.

2. A method according to claim 1 wherein said pre-printed information is contained in a pre-printed bar code.

3. A method according to claim 2 wherein the test certificate producer uses a combined printer and bar-code scanner to read said pre-printed bar code and also to print said printed test certificate.

4. A method according to claim 1 wherein said certificate checker performs the following steps:

a) entering said authentication code into a computer;

b) entering information in the printed certificate into the computer;

c) causing the computer to cryptographically generate a check code from said information; and d) causing the computer to compare said check code with said authentication code and to generate a warning indication if said check code does not correspond with said authentication code.

5. A method according to claim 1 wherein said authentication authority cryptographically generates said authentication code using a secret key known to both the authentication authority and said certificate checker, but not known to said test certificate producer.

6. A method according to claim 1 wherein said authentication code is generated by performing a key-dependent one-way bash of said test information and said pre-printed information, using a secret key.

7. A method according to claim 1 wherein said authentication authority generates said authentication code using the private key of a public/private key pair, and wherein the certificate checker checks the authentication code using the public key of said public/private key pair.

8. A method according to claim 1 wherein communication between said test certificate producer and said authentication authority is protected by encryption.

9. A method for producing and authenticating a printed test certificate comprising the following steps:
   a) a test certificate producer performs a test and sends information to be included in a test certificate to an authentication authority;
   b) the authentication authority checks whether the test certificate producer is authorized to perform the test and, if so, cryptographically generates an authentication code from said information, and sends the authentication code back to the test certificate producer;
   c) upon receipt of the authentication code from the authentication authority, the test certificate produce prints the test certificate, including both said information and said authentication code; and
   d) upon presentation of the printed test certificate for authentication, a certificate checker cryptographically checks the authentication code against said information in the printed test certificate to determine whether the printed test certificate is authentic;
   e) wherein the test certificate is printed on a blank test certificate which includes a pre-printed bar-coded serial number;
   f) wherein the test certificate producer uses a combined printer and bar-code scanner to read said pre-printed bar-coded serial number from said black test certificate and sends said pre-printed bar-coded serial number to said authentication authority;
   g) wherein said authenticaion authority uses said pre-printed bar-coded serial number in generating said authentication code;
   h) and wherein the test certificate producer uses the combined printer and bar-code scanner to print said information and said authentication code on to said blank test certificate, to form said printed test certificate.

10. A method according to claim 1 wherein said pre-printed information comprises a serial number.

* * * * *